US009901107B2

(12) United States Patent
Delporte et al.

(10) Patent No.: US 9,901,107 B2
(45) Date of Patent: Feb. 27, 2018

(54) WHEAT GLUTEN PELLETS

(75) Inventors: Christian Delporte, Anhiers (FR); Franck Foulon, Lestrem (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 12/999,481

(22) PCT Filed: Jul. 6, 2009

(86) PCT No.: PCT/FR2009/051319
§ 371 (c)(1),
(2), (4) Date: Dec. 16, 2010

(87) PCT Pub. No.: WO2010/004196
PCT Pub. Date: Jan. 14, 2010

(65) Prior Publication Data
US 2011/0104355 A1  May 5, 2011

(30) Foreign Application Priority Data
Jul. 11, 2008 (FR) ...................... 08 54787

(51) Int. Cl.
| A23J 3/18 | (2006.01) |
| A23K 1/00 | (2006.01) |
| A23K 50/60 | (2016.01) |
| A23K 40/20 | (2016.01) |
| A23K 20/147 | (2016.01) |
| A23K 50/30 | (2016.01) |
| A23K 50/80 | (2016.01) |
| A23P 10/25 | (2016.01) |
| A23L 33/185 | (2016.01) |

(52) U.S. Cl.
CPC ................ A23K 50/60 (2016.05); A23J 3/18 (2013.01); A23K 20/147 (2016.05); A23K 40/20 (2016.05); A23K 50/30 (2016.05); A23K 50/80 (2016.05); A23L 33/185 (2016.08); A23P 10/25 (2016.08)

(58) Field of Classification Search
CPC ......... A23J 3/18; A23K 40/20; A23K 20/147; A23K 50/80; A23K 50/60; A23K 50/30; A23L 33/185; A23P 10/25
See application file for complete search history.

(56) References Cited

U.S. PATENT DOCUMENTS

| 3,605,643 A | 9/1971 | Barr |
| 3,814,815 A * | 6/1974 | Hashimoto et al. |
| 3,925,343 A * | 12/1975 | Hampton et al. ............. 530/374 |
| 3,951,938 A * | 4/1976 | Kerkkonen et al. .......... 530/374 |
| 5,102,671 A | 4/1992 | Coles |
| 6,309,680 B1 * | 10/2001 | Lim et al. ....................... 426/28 |
| 2005/0214349 A1 | 9/2005 | Nie et al. |

FOREIGN PATENT DOCUMENTS

| EP | 0711510 A1 | 5/1996 |
| EP | 0838159 A1 | 4/1998 |
| EP | 1527700 A1 * | 5/2005 |
| EP | 1785039 A1 * | 5/2007 |
| WO | 9944437 A1 | 9/1999 |
| WO | 2007054465 A1 | 5/2007 |

OTHER PUBLICATIONS

Definition Relative Humidity. [Online]. Downloaded from <URL: http://www.thefreedictionary.com/p/relative%20humidity> 1 pg.*
E. Bardi et al., "Room and low temperature brewing with yeast immobilized on gluten pellets", in Process Biochemistry, vol. 32-8, p. 691-696, 1997.
International Search Report, dated Nov. 23, 2009, from corresponding PCT application.

* cited by examiner

*Primary Examiner* — Emily Le
*Assistant Examiner* — Subbalakshmi Prakash
(74) *Attorney, Agent, or Firm* — Blank Rome LLP

(57) ABSTRACT

The present invention relates to protein pellets including wheat gluten, characterized in that the gluten has: a water retention capacity, determined according to a test A, of between 40 and 160%, preferably between 100 and 150%; and a viscoelastic behaviour, according to the Chopin Alveograph, determined at a P/L parameter value of between 3 and 10, preferably between 3 and 8.

7 Claims, No Drawings

WHEAT GLUTEN PELLETS

The subject of the present invention is wheat gluten pellets, and the process for their manufacture.

Wheat gluten conventionally exists in two distinct forms: vital wheat gluten and devitalized wheat gluten.

Vital wheat gluten (also called elastic gluten) is the water-insoluble protein fraction extracted from wheat flour by the wet process and then dried.

Vital wheat gluten has very specific functional properties. When it is rehydrated, it forms a viscoelastic cohesive paste capable of absorbing 1.5 to 2 times its weight in water.

The viscoelasticity and the absorption of water are responsible for the term "vital".

Glutenins and gliadins, the two major protein components of vital gluten, interact in the presence of water and are responsible for these viscoelastic properties:
- extensibility (i.e. the property of elongation to rupture) is due to low-molecular weight gliadins,
- elasticity (i.e. the property of returning to the initial state after deformation) and tenacity (i.e. the property of resistance to deformation) are due to glutenins of higher molecular weight.

Devitalized gluten is, for its part, obtained by denaturation (in particular heat denaturation, or by enzymatic solubilization) of vital wheat gluten.

It therefore no longer exhibits its viscoelastic properties in the hydrated state. Its protein content and it nutritive value nevertheless remain those of vital wheat gluten.

Depending on the required viscoelastic properties, the applications of vital or devitalized wheat gluten are numerous:
- in human foodstuffs: in particular in milling, as baking aid, in bakery and Viennese products and in pastry products, in the manufacture of noodles; in the manufacture of breakfast cereals, snacks and meat products;
- in animal feed: especially as shrimp feed, piglet feed, milk replacers, fish feed, pet feed;
- in fermentation: as support for microorganisms in systems using immobilized cells.

The use of vital or devitalized gluten in the applications mentioned above is nevertheless hampered by the fact that powdered gluten does not flow freely or generates dust during bulk unloading operations.

The dispersion in water, when it is obtained, is not very stable, the particles of gluten having a tendency to form into a mass and to agglomerate.

The hydration of a powder containing a large proportion of vital gluten moreover leads to a lumpy product which, upon vigorous stirring, is converted to a rubbery elastic mass that is very difficult to work.

To overcome this situation, specialists in the considered field have very quickly proposed agglomerating vital wheat gluten powder in the form of pellets in order to facilitate the handling and use thereof.

Two categories of pellets are then proposed:
- pellets whose wheat gluten has retained all its properties, and thus retains the name vital wheat gluten,
- pellets prepared by means of thermal processes, which leads to the denaturation of the proteins; the pellets will therefore be composed of devitalized wheat gluten.

For vital wheat gluten pellets, it is possible to consider the teachings:
- of U.S. Pat. No. 3,925,343, which describes the manufacture of wheat gluten agglomerates by a process which preserves the vital character thereof.

This process consists in subjecting, in a fluidized bed, the individual gluten particles to the action of a wetting agent so as to make the surfaces of the particles sticky, in intimately mixing said particles so that they adhere to each other, in the form of coarse and porous agglomerates.

These agglomerates are then dried so as to have a residual moisture content of less than 10%.

The shape and dimension of these particles is nevertheless very uncertain (size predominantly greater than 149 µm).
- of EP 1 785 039, which relates to pellets essentially consisting of compressed proteins, preferably characterized in that the proteins comprise vital gluten.

Their process of manufacture involves stages requiring hot air or steam in order to increase the temperature of the proteins and/or their moisture from 0 to 5%, preferably by more than 3% and then introduce them into a mold in order to manufacture said pellets.

The maximum moisture content of the vital wheat gluten pellets is at most 11.5%, preferably at most 8%, more preferably at most 6%.

EP 1 527 700, which relates to a fish feed composition, characterized in that it comprises from 1 to 75% by weight of vital gluten, and from 25 to 85% of oil of decorticated oilseeds and/or of maize germ, and the pellets thus obtained.

The process consists here in mixing the ingredients of the fish feed composition, "molding" them as pellets and then treating them with steam for 1 to 30 s.

EP 838 159, which describes a process for reducing a vital gluten mass, characterized in that the wet gluten mass is reduced in size when it is in a brittle state.

The reduction in size consists in cooling the gluten mass to a temperature of −75° C. or less, forming sheets of 0.35 cm or less or forming granules of 1 to 100 mm before cooling and using mechanical forces for rupture.

To be noted: the removal of ice crystals formed during the cooling at the surface of the particles formed, drying of the particles of gluten reduced in size, and maintenance of the vitality of the gluten at all the temperatures tested.

EP 1 785 039, which relates to pellets essentially consisting of compressed proteins, whose proteins comprise vital wheat gluten.

To obtain these pellets, the process described consists in subjecting vital gluten, in a suitable equipment, to a treatment with hot air or steam, in order to increase the temperature of the proteins and/or the moisture content to a value between 0 and 5%, preferably of the order of 3%.

The proteins are then molded as pellets.

It is nevertheless recommended to finely control these stages, by paying very close attention:
- to the configuration of the die for the manufacture of the pellets, which determines their moisture content. It is thus necessary here to control the ratio (A) of the thickness over the diameter of said pellets, which should be maintained between 10 and 25, and
- to the ratio (A) over the process temperature.

These empirical data were expressed by the expression of a ratio (B): ratio of the temperatures over (A), set at a value between 2 and 8.

More specifically, the temperature values are then set between 50 and 80° C.

These multiple controls do not make this process particularly attractive.

For devitalized wheat gluten pellets, it is possible to consider the teachings:
- of EP 711 510 to NISSHIN FLOUR MILLING which describes a process for the production of fermentation materials, having a step for the manufacture of gluten pellets. The moisture of said pellets thus manufactured is thought to be between 12 and 18%; the possibility of manufacturing pellets depends on the moisture content of the proteins and on their denaturation.

The process carried out consists in sending steam directly over the gluten powder. The water content of the "molded" vital gluten is more than 12%; the pellets moreover have a size in the millimeter range.

of the article by E. BARDI et al., in *Process Biochemistry*, 32-8, 691-696, 1997), in which gluten pellets used as pellet support for microorganisms, such as yeasts, are described.

Their manufacturing process consists in mixing wheat flour with tap water; the dough obtained is then extruded, and then abundantly washed in order to remove the starch therefrom.

The gluten is then molded as small spheres (pellets having a diameter of 1.5 to 2 cm, dried at 105° C. for 5 hours and then cooled to room temperature.

The extrusion and drying treatment as set out quite obviously leads to devitalized gluten pellets.

of U.S. Pat. No. 3,605,643 to BARR et al. which relates to a device for molding gluten as pellets and which is designed in particular to shape and dry the pasty gluten mass.

The process consists in introducing moist gluten into a hot air stream in the form of discrete pellets which are coated with material partially dried in suspension in said air stream before being subjected to a disintegration treatment.

From all the preceding text, it can be observed that the pelleting processes aimed at preserving the viscoelastic properties of the gluten require the use of complex and finely controlled methods.

As for the methods for the manufacture of devitalized wheat gluten pellets, which are simpler to carry out, they are performed quite obviously at the expense of the properties of vital gluten.

The aim of the invention is to provide a novel process for pelleting vital wheat gluten which does not exhibit the disadvantages of known processes.

The wheat gluten pellets obtained according to this process retain a sufficient water retention capacity and their elasticity properties are reduced, in the sense that at constant tenacity, the gluten thus pelleted loses its extensibility compared with that of conventional vital wheat gluten pellets.

The wheat gluten pellets according to the present invention may thus be termed as "partially vital". The subject of the invention is therefore wheat gluten pellets, characterized in that they exhibit:
- a water retention capacity, determined according to a test A, between 40 and 160%, preferably between 100 and 150%,
- a viscoelastic behavior, according to the Chopin alveograph, equal to the ratio of the deformation resistance over the extensibility P/L between 3 and 10, preferably between 3 and 8.

The partially vital character of the wheat gluten pellets in accordance with the invention manifests itself first of all by their preserved water retention capacity.

This water retention capacity is determined according to a test A.

This test A consists first of all in grinding the wheat gluten pellets in an IKA A10 mill manufactured by the company IKA®.

The grinding consists in placing 30 g of pellets in the mill and then grinding under circulating cold water for 2 minutes.

The particle size of the ground product obtained is of the order of 0 residue on 500 μm, <10% of residue on 250 μm, <50% of residue on 100 μm.

In a dish, 10.0 g of pellets thus ground are weighed. There are added 25 ml of drinking water (between 5 and 20° C.) and the mixing is carried out with a glass rod.

The mixture is allowed to stand for 15 minutes.

The quantity of water not retained is extracted by centrifugation (10 min at 4000 revolutions).

The centrifuge is allowed to stop on its own (without brakes), the supernatant is discarded and the remaining hydrated gluten is weighed (P).

The retention is expressed according to the equation (P-10)×10 expressed as %.

The percentage of water retained therefore expresses the water retention capacity.

This water retention capacity of the gluten pellets in accordance with the invention is determined at a value between 40 and 160%, preferably between 100 and 150%, for example between 100 and 145%, or between 100 and 140%.

By way of comparison, vital wheat gluten has a water retention capacity, determined according to the test A, between 150 and 180%.

The gluten pellets in accordance with the invention therefore have a slightly reduced water retention capacity compared with vital wheat gluten.

Devitalized gluten, for its part, has no water retention capacity according to the meaning of test A.

The partially vital character of the wheat gluten pellets in accordance with the invention also manifests itself by their viscoelastic behavior, determined according to the Chopin alveograph.

The Chopin alveograph is a test known to a person skilled in the art, a test which makes it possible to measure the tenacity and extensibility capacities of a dough formed with a mixture of wheat starch, wheat gluten of the ground pellets as described above, glycerin, salt water at 45 g/l, while preserving for all the trials a constant water/gluten (hydration) ratio.

The principle of the measurement consists in forming a bubble by blowing air under a thin sheet of dough, until it ruptures. The alveogram represents the curve of the air pressure retained by the bubble as a function of time.

The interpretation of these parameters is as follows:
P: represents the deformation resistance of the dough (or tenacity) under the pressure of air blown in.

It is determined by the measurement of the maximum height of the graph between the base and the apex of the peak, in mm.

It is called maximum overpressure or more commonly pressure since it is the maximum pressure recorded inside the bubble (expressed in mm $H_2O$).

L: corresponds to the extensibility of the dough, from the beginning of swelling up to bursting.

It is the length of the graph in mm.

P/L: It is the graph configuration ratio. It is obtained by dividing the value of P by the value of L.

The gluten pellets in accordance with the invention thus have a viscoelastic behavior, according to the Chopin alveograph, determined at a value of the P/L parameter between 3 and 10, preferably between 3 and 8, for example between 3.5 and 10 or between 4 and 8.

By way of comparison, vital wheat gluten has a value of the P/L parameter less than or equal to 3.

The wheat gluten pellets according to the invention may also be characterized by a viscoelastic behavior, according to the Chopin alveograph, determined at a value of the L parameter less than 100, preferably between 20 and 80, for example between 20 and 90.

By way of comparison, vital wheat gluten has a value of the L parameter greater than or equal to 100.

As devitalized gluten has no viscoelastic property, it cannot therefore be characterized by the Chopin alveograph.

The water retention values and the values of parameters according to the Chopin alveograph express the partially vital character of the wheat gluten pellets in accordance with the invention.

The wheat gluten pellets in accordance with the invention indeed preserve a sufficient water retention capacity, further allowing the gluten to express its ability to form a network.

The wheat gluten pellets in accordance with the invention may also be characterized by:
their protein content,
their relative humidity,
their durability.

The protein content is determined by measurement of the total nitrogen content according to the method standardized (NF V18-120) by the DUMAS method. This method consists of a combustion of the sample at high temperature. The various elements of the sample (C, H, N, S, O) are converted to the gaseous form ($CO_2$, $H_2O$, Nox, $SO_2$, halogens, $O_2$ in excess).

Various traps and oxidation and reduction catalysts make it possible to retain only $N_2$. This gas is then measured by means of a catharometric detector, the detection principle of which is linked to the conductivity of the gas to be measured.

The protein content is calculated in relation to the response of the recalibrated detector, and is expressed as N6.25.

The wheat gluten pellets in accordance with the invention thus have a protein content of more than 80% N6.25 expressed relative to the dry weight of the pellets (N6.25/dry).

The determination of the relative humidity (or loss on drying) is carried out by measuring the loss of mass after treatment in an oven set at 130-133° C., under atmospheric pressure, of 5 grams of product ground in an IKA mill (as described above), for 1 h 30 min.

The wheat gluten pellets in accordance with the invention thus have a relative humidity between 6 and 12%.

The durability, for its part, represents the quantity of nondeteriorated pellets retained on a sieve when these pellets are set in motion in a blender.

To do this, a mass (m1) of 500 g of pellets is placed in a blender of the Rotor Quick Test CWZ 302 type which is set in motion for 10 seconds and sieving is performed for 10 seconds on a sieve with a 2.5 mm square mesh.

The sieve residue of mass (m2) is weighed.

The durability is expressed according to the equation m2/m1×100, expressed as %.

The wheat gluten pellets in accordance with the invention thus have a durability between 50 and 100%, preferably between 80 and 100%.

All the properties of the wheat gluten pellets in accordance with the invention thus make it possible to use them advantageously in processes for the manufacture of animal feed, in which processes numerous constraints make the use of vital wheat gluten difficult.

There may be mentioned, among said constraints, the need to:
receive a gluten powder in bulk,
preserve a capacity for water retention and binding property that are sufficient compared with vital wheat gluten,
add water or steam to a mixture containing a large proportion of gluten, while avoiding the problems of formation of a dough that is too elastic.

These processes are conventionally processes for the manufacture of extruded feed for fish or pets, the manufacture of pellet feed for piglets or shrimps, milk substitutes to be diluted in water for young mammals.

The wheat gluten pellets in accordance with the invention are thus advantageously used in processes for the manufacture of feed preparations for animals comprising from 5 to 50% of wheat gluten, preparations chosen from the group of extruded preparations, pellet preparations and preparations intended to be rehydrated.

The wheat gluten pellets in accordance with the invention can be prepared with the aid of a process which consists in compressing vital wheat gluten powder under specific conditions.

This process comprises the following steps consisting in:
1) preparing a vital wheat gluten powder of particle size such that at least 20%, preferably at least 50% of the particles have a size greater than 250 μm,
2) introducing the wheat gluten powder thus prepared into the blender of a pellet press,
3) conditioning the wheat gluten powder thus prepared by regulated addition of steam at the inlet of the blender in order to obtain at the outlet of the blender a temperature of the air-powder mixture between 10 and 50° C., preferably between 30 and 45° C.,
4) introducing the wheat gluten powder into the die of the pellet press in order to obtain the wheat gluten pellets,
5) cooling the pellets through a horizontal cooler,
6) recovering the pellets thus obtained.

In step 1), a vital wheat gluten powder is prepared which has a particle size such that at least 20% of the particles have a size greater than 250 μm.

The expression "vital wheat gluten powder" is understood to mean, for the purposes of the present invention, a wheat gluten powder containing at least 80% by weight, on a dry basis, of proteins, 5 to 8% by weight of water, the balance consisting of phospholipids, fiber, residual starch and inorganic matter.

The particle size of the wheat gluten powder conventionally depends on the technology used to dry the wheat gluten extracted from flour by the wet process (called green gluten).

The applicant company thus recommends preparing a wheat gluten powder whose particle size is as high as possible.

Indeed, the applicant company has found that the particle size directly influences:
the vitality of the powder and the vitality of the pellets after the pelleting step,
the technical feasibility of the actual pelleting.

A powder that is too fine, i.e. having less than 1% by weight of particles of size >250 μm, will be too volatile and it will not be possible to hold it down in order for it to be compressed in the die. This will result in the die being jammed and stopping.

Preferably, the wheat gluten powder should have a weight fraction at least 50% above 250 μm.

In step 2, the wheat gluten powder thus prepared is introduced into the blender of a pellet press.

As will be exemplified below, the applicant company uses an LYD 66/23 type pellet press marketed by the company STOLZ.

The transport and metering should make it possible to have a continuous and stable feed by a metering system in order to have a stable operation of the blender and a homogeneous mixing for feeding the pelleting die.

The stability of the throughput will make it possible to have a stable energy consumption and a durable mechanical operation.

With a pellet press of the LYD 66/23 type marketed by the company STOLZ, the applicant company recommends setting the throughput at a value between 2 and 6 t/h, preferably of the order of 4 t/h.

In step 3, the wheat gluten powder thus prepared is conditioned by regulated addition of steam at the inlet of the blender in order to obtain at the outlet of the blender a temperature of the air-powder mixture between 10 and 50° C.

The addition of steam should be performed with dry steam in order to avoid the wheat gluten powder caking in the blender which can cause jamming.

The speed of rotation of the shaft and of the blades of the blender should be sufficient to obtain homogeneous mixing at the outlet of the blender with a temperature of the air-powder mixture between 10 and 50° C., preferably between 30 and 45° C. at the outlet of the blender.

With a pellet press of the LYD 66/23 type marketed by the company STOLZ, the applicant company recommends setting the speed at a value between 250 and 400 revolutions/min.

The temperature is obtained by regulated or controlled addition of steam, with the aid of a regulating valve, at the inlet of the blender in relation to the measurement of the blender outlet temperature in order to obtain a temperature set to the reference temperature.

The steam added has a role of "lubricant" and facilitates the passage of the powder through the die.

The steam also has a role of binder between the particles of gluten powder during pelleting.

In step 4, the wheat gluten powder is introduced into the die of the pellet press in order to obtain the wheat gluten pellets.

The die is characterized by the compression ratio which is the ratio of the compression length over the compression diameter.

This ratio is between 15 and 25.

The ratio makes it possible to obtain a dust level of less than 20% by weight at the outlet of the die.

In step 5, the pellets are cooled through a horizontal cooler in order to ensure hardness and maintenance of the granules.

For compression ratio values in step 4 greater than 15, after cooling of the pellets in this step 5, pellets are obtained whose durability is between 50 and 100%, preferably between 80 and 100%.

The invention will be understood more clearly with the aid of the following examples, which are intended to be illustrative and nonlimiting.

EXAMPLE 1

There is prepared 1 tonne of wheat gluten powder having the following characteristics:
- at least 50% by weight of particles having a size greater than 250 μm,
- protein content >83% by weight dry/dry
- water content >9%
- P/L value >3 according to the Chopin alveograph.

The blender of a pellet press of the LYD 66/23 type marketed by the company STOLZ is fed at a throughput of 4 t/h.

The feeding is performed via a metering screw whose speed is set in order to obtain a throughput of the order of 4 t/h, and so as to obtain, after regulated addition of steam by means of a regulating valve, a stable blender outlet temperature of 35° C.

At the outlet of the blender, the powder is directed by gravity to the die of the pelleting press whose compression ratio is 20.

The pellets are then cooled to room temperature on a horizontal cooler RHS2P 20.60 marketed by the company STOLZ.

After grinding the granules with the aid of the IKA mill as described above and analyzing the ground product obtained, the wheat gluten pellets in accordance with the invention have the characteristics assembled as 2 series of samples (series 1 and 2).

TABLE 1

|  | Series 1 | Series 2 |
|---|---|---|
| Water retention (%) Chopin alveograph | 130 | 130 |
| P | 182 | 145 |
| L | 26 | 41 |
| P/L | 7.0 | 3.5 |
| Protein content (N6.25/dry) | 86.8 | 86.9 |
| Water content | 9.0 | 11.2 |
| Durability | 58 | 92 |

By way of comparison, table 2 below presents the values measured on two samples of vital wheat gluten and devital wheat gluten, marketed by the applicant company under the respective trademarks VITEN® and DEVITEN®.

TABLE 2

|  | VITEN ® | DEVITEN ® |
|---|---|---|
| Water retention (%) | 170 | No retention |
| Chopin alveograph |  | Very brittle, tenacious dough which does not leave the kneading machine |
| P | 70 | |
| L | 120 | |
| P/L | 0.6 | |
| Protein content (N6.25/dry) | 85.4 | 85.5 |
| Water content | 6.2 | 6.7 |

The wheat gluten pellets in accordance with the invention, as set out above, therefore preserve well their water retention capacity, with however somewhat reduced elastic properties.

EXAMPLE 2

The capacity of the wheat gluten pellets in accordance with the invention to preserve the free-flowing and homogeneous character of a mixture of proteins rehydrated in the hot state in a preconditioner is tested by measuring the flow of the final mixture thus obtained through a sieve with a mesh size of 1000 μm.

To do this, a mixture of proteins in powdered form, comprising 50% by weight of wheat gluten pellets in accordance with the invention, is introduced in the hot state and with stirring into a jacketed CUTTER STEPHAN UMC/SK5 preconditioner, marketed by the company STEPHAN, equipped with direct steam injection.

Steam is thus injected in order to raise the temperature of said mixture to 90° C. and hydrate it to about 20% of water.

The mixture thus obtained is then sieved on a sieve with a coarse mesh in order to recover the agglomerates and the percentage of residue is then calculated.

Table 3 below presents the basic formula of the mixtures to be tested.

TABLE 3

| Nature of the proteins | Content as % | Content by weight (g) |
| --- | --- | --- |
| MILUREX ® | 40.5 | 202.5 |
| GLUTALYS ® | 7 | 35 |
| Rapeseed oil | 2.5 | 12.5 |
| Wheat gluten as pellets according to the invention or not | 50 | 250 |

The following are tested:
two control batches of vital gluten powder,
three batches of wheat gluten pellets manufactured according to example 1 above, ground in a hammer mill of the trademark RETSCH equipped with a 1000 µm screen, so as to have the same particle size as the control vital gluten powder (100 to 1000 µm).

The preconditioner is preheated by injection of steam (0.7 bar) into the jacket of the CUTTER of trademark STEPHAN® and the powders are mixed as minimum speed (100 rpm) for 4 min.

After 4 min of mixing, the jacket heating is stopped.

Steam is injected directly into the chamber of the CUTTER at a pressure of 0.7 bar, with stirring at 100 rpm, for 30 seconds, in order to obtain a 20% hydration of the powders and a temperature of 90° C.

The final mixture obtained is sieved on a sieve with square mesh of side 0.7 cm.

The percentage of residue is calculated by the equation: (mass of the agglomerates/total mass of the mix)×100.

The results obtained are presented in table 4 below.

TABLE 4

| | % by weight of residue on 0.7 cm |
| --- | --- |
| Vital gluten | 32.7% |
| | 30% |
| Gluten pellets in accordance with the invention | 2.6% |
| | 1.1% |
| | 2.8% |

These results clearly show that vital gluten, by forming its viscoelastic network, agglomerates during the preconditioning phase with the other proteins of the mixture, and thus forms a heterogeneous mixture composed, on the one hand, of free-flowing powders and, on the other hand, of a lump of gluten.

By contrast, the wheat gluten pellets in accordance with the invention, ground, do not form networks and the mixture advantageously remains free-flowing and homogeneous.

The invention claimed is:

1. A wheat gluten pellet, having:
   a water retention capacity between 100 and 140%, said water retention capacity being determined by test A, said test A comprising:
   (i) grinding 30 g of wheat gluten pellets in an IKA A10 mill under circulating cold water for 2 minutes to obtain ground pellets of 0 residue on 500 µm, <10% of residue on 250 µm, and <50% of residue on 100 µm,
   (ii) mixing using a glass rod 10.0 g of ground pellets with 25 ml of drinking water at between 5 and 20° C.,
   (iii) allowing the mixture to stand for 15 minutes,
   (iv) centrifuging the mixture in a centrifuge for 10 minutes at 4000 revolutions,
   (v) allowing the centrifuge to stop on its own, the centrifuged mixture comprising a supernatant and hydrated gluten,
   (vi) discarding the supernatant,
   (vii) weighing the hydrated gluten, (viii) determining the water retention capacity from the equation (P−10) ×10, wherein the weight in g of the hydrated gluten is P; and
   a viscoelastic behavior according to a Chopin alveograph equal to the ratio of deformation resistance in mm over extensibility in mm between 3.5 and 10,
   wherein the wheat gluten pellets are prepared by a process comprising the steps of:
   1) preparing a vital wheat gluten powder of particle size such that at least 50% of the particles have a size greater than 250 µm,
   2) introducing the wheat gluten powder thus prepared into the blender of a pellet press,
   3) conditioning the wheat gluten powder thus prepared by regulated addition of steam at the inlet of the blender in order to obtain at the outlet of the blender an air-powder mixture temperature between 30 and 45° C.,
   4) introducing the wheat gluten powder into the die of the pellet press in order to obtain the wheat gluten pellets,
   5) cooling the pellets through a horizontal cooler, and
   6) recovering the pellets thus obtained.

2. The pellet as claimed in claim 1, wherein the viscoelastic behavior according to the Chopin alveograph is determined at a value of the extensibility less than 100 mm.

3. The pellet as claimed in claim 1, wherein the pellet has a protein content of more than 80% calculated as (N×6.25) on a dry weight basis, wherein N is the nitrogen content.

4. The pellet as claimed in claim 1, wherein the pellet has a water content between 6 and 12%.

5. The pellet as claimed in claim 1, wherein the pellet has a durability between 50 and 100%.

6. A process of forming an animal feed preparation comprising:
   preparing an animal feed preparation comprising from 5 to 50% of wheat gluten using the wheat gluten pellets according to claim 1, said animal feed preparation being selected from the group consisting of an extruded preparation, a pellet preparation and a preparation intended to be rehydrated.

7. A wheat gluten pellet consisting of:
   a protein content of more than 80% calculated as (N×6.25) on a dry weight basis, wherein N is the nitrogen content;
   a water content between 6 and 12%; and
   a balance of phospholipids, fiber, residual starch and inorganic matter, wherein said wheat gluten pellet has a water retention capacity between 100 and 140%, said water retention capacity being determined by test A:
(i) grinding 30 g of wheat gluten pellets in an IKA A10 mill under circulating cold water for 2 minutes to obtain ground pellets of 0 residue on 500 μm, <10% of residue on 250 μm, and <50% of residue on 100 μm,
(ii) mixing using a glass rod 10.0 g of ground pellets with 25 ml of drinking water at between 5 and 20° C.,
(iii) allowing the mixture to stand for 15 minutes,
(iv) centrifuging the mixture in a centrifuge for 10 minutes at 4000 revolutions,
(v) allowing the centrifuge to stop on its own, the centrifuged mixture comprising a supernatant and hydrated gluten,
(vi) discarding the supernatant,
(vii) weighing the hydrated gluten,
(viii) determining the water retention capacity from the equation $(P-10) \times 10$, wherein the weight in g of the hydrated gluten is P; and
wherein said wheat gluten pellet has a viscoelastic behavior according to a Chopin alveograph equal to the ratio of deformation resistance in mm over extensibility in mm between 3.5 and 10.

* * * * *